(12) United States Patent
Rasmusson, Jr. et al.

(10) Patent No.: US 11,080,534 B2
(45) Date of Patent: Aug. 3, 2021

(54) IDENTIFYING OBJECTS FOR DISPLAY IN A SITUATIONAL-AWARENESS VIEW OF AN AUTONOMOUS-VEHICLE ENVIRONMENT

(71) Applicant: Lyft, Inc., San Francisco, CA (US)

(72) Inventors: Robert Earl Rasmusson, Jr., San Francisco, CA (US); Taggart Matthiesen, Kentfield, CA (US); Craig Dehner, San Francisco, CA (US); Linda Dong, San Francisco, CA (US); Frank Taehyun Yoo, San Carlos, CA (US); Karina van Schaardenburg, San Francisco, CA (US); John Tighe, San Francisco, CA (US); Matt Vitelli, San Francisco, CA (US); Jisi Guo, San Francisco, CA (US); Eli Guerron, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 916 days.

(21) Appl. No.: 15/812,645

(22) Filed: Nov. 14, 2017

(65) Prior Publication Data
US 2018/0136000 A1 May 17, 2018

Related U.S. Application Data

(60) Provisional application No. 62/422,025, filed on Nov. 14, 2016.

(51) Int. Cl.
*G01C 21/36* (2006.01)
*G06K 9/00* (2006.01)
(Continued)

(52) U.S. Cl.
CPC ..... *G06K 9/00791* (2013.01); *B62D 15/0285* (2013.01); *G01C 21/365* (2013.01);
(Continued)

(58) Field of Classification Search
CPC ............ G06K 9/00791; G06K 9/6279; B62D 15/0285; G01C 21/3638; G01C 21/365;
(Continued)

(56) References Cited

U.S. PATENT DOCUMENTS 9,171,079 B2 * 10/2015 Banka .................. G06F 16/951
9,225,793 B2 * 12/2015 Dutta .................. H04L 67/2823
(Continued)

FOREIGN PATENT DOCUMENTS

GB 2536770 A * 9/2016 ........... G05D 1/0088

OTHER PUBLICATIONS

S. Sheik et al., "A Multiple Inductive Loop Vehicle Detection System for Heterogeneous and Lane-Less Traffic," 2012, vol. 61, Publisher: IEEE.*
(Continued)

*Primary Examiner* — Tuan C To
(74) *Attorney, Agent, or Firm* — Baker Botts L.L.P.

(57) ABSTRACT

In one embodiment, a method includes receiving autonomous-vehicle sensor data from a sensor array of an autonomous vehicle. The autonomous-vehicle sensor data indicates an object in an external environment of the autonomous vehicle. The method also includes accessing secondary data associated with the object from one or more secondary-data sources that are independent of the sensor array of the autonomous vehicle. The method also includes determining, based on the autonomous-vehicle sensor data and the secondary data, an object graphic to visually represent the object. The method also includes providing for display a visual representation of the external environment of the autonomous vehicle that includes the determined object graphic to visually represent the object.

20 Claims, 9 Drawing Sheets

(51) Int. Cl.
*G05D 1/00* (2006.01)
*G05D 1/02* (2020.01)
*G06T 7/20* (2017.01)
*G06K 9/62* (2006.01)
*B62D 15/02* (2006.01)

(52) U.S. Cl.
CPC ....... *G01C 21/3638* (2013.01); *G05D 1/0044* (2013.01); *G05D 1/0088* (2013.01); *G05D 1/0212* (2013.01); *G05D 1/0246* (2013.01); *G05D 1/0274* (2013.01); *G06K 9/6267* (2013.01); *G06T 7/20* (2013.01); *B60W 2554/00* (2020.02); *G05D 2201/0212* (2013.01); *G05D 2201/0213* (2013.01); *G06T 2207/30252* (2013.01); *G06T 2207/30256* (2013.01); *G06T 2207/30261* (2013.01)

(58) Field of Classification Search
CPC .. G05D 1/0044; G05D 1/0088; G05D 1/0212; G05D 1/0246; G05D 1/0274; G05D 2201/0212; G05D 2201/0213; G06T 7/20; G06T 2207/30252; G06T 2207/30256; G06T 2207/30261; B60W 2554/00
USPC .......................................................... 701/23
See application file for complete search history.

(56) References Cited

U.S. PATENT DOCUMENTS

| | | | |
|---|---|---|---|
| 10,317,901 B2 * | 6/2019 | Oder | G05D 1/0088 |
| 10,496,766 B2 * | 12/2019 | Levinson | G05D 1/0214 |
| 10,740,658 B2 * | 8/2020 | Pollach | G06K 9/00791 |
| 2013/0039409 A1 * | 2/2013 | Gupta | G06T 7/215 |
| | | | 375/240.02 |
| 2016/0221500 A1 * | 8/2016 | Sakai | G08G 1/165 |
| 2017/0123428 A1 * | 5/2017 | Levinson | G01S 13/86 |
| 2017/0174227 A1 * | 6/2017 | Tatourian | G06K 9/3241 |
| 2017/0253254 A1 * | 9/2017 | Sweeney | B60R 1/00 |
| 2017/0262709 A1 * | 9/2017 | Wellington | G06K 9/6201 |
| 2017/0285642 A1 * | 10/2017 | Rander | G05D 23/1905 |
| 2017/0315771 A1 * | 11/2017 | Kerr | H04N 7/181 |
| 2017/0371336 A1 * | 12/2017 | Mei | B60W 30/08 |
| 2018/0099646 A1 * | 4/2018 | Karandikar | B60W 40/02 |
| 2018/0121763 A1 * | 5/2018 | Surnilla | G06K 9/00805 |
| 2018/0126960 A1 * | 5/2018 | Reibling | G05D 1/021 |

OTHER PUBLICATIONS

Nur et al., "Vehicle Classification Using Z-Score and Modelling Neural Network for Forward Scattering Radar," 2014, Publisher: IEEE.*

* cited by examiner

US 11,080,534 B2

IDENTIFYING OBJECTS FOR DISPLAY IN A SITUATIONAL-AWARENESS VIEW OF AN AUTONOMOUS-VEHICLE ENVIRONMENT

PRIORITY

This application claims the benefit, under 35 U.S.C. § 119(e), of U.S. Provisional Patent Application No. 62/422,025, filed 14 Nov. 2016, which is hereby incorporated by reference in its entirety.

BACKGROUND

A dynamic transportation matching system may enable users (or requestors) to request rides from autonomous vehicles. A user may request a ride through the dynamic transportation matching system with a ride-service application on a mobile device of the user. The dynamic transportation matching system may, according to one or more privacy settings designated by a user, store rider information (such as for example rider preferences, pick-up or drop-off locations, payment information, or other suitable information) associated with the user.

Traditionally, transportation services have been provided by a human operating vehicle, such as taxis and ride sharing services. Improvements to computer technology have led to increasing efforts to automate these services using autonomous vehicles that do not require a human operator. However, riders are accustomed to traveling with a human driver that can see the road and avoid objects in the car's path. In an autonomous vehicle, a rider may not understand how and in what way the autonomous vehicle perceives the environment around the vehicle, including objects and obstacles in the road. This may cause the rider to become anxious or fearful during a ride in an autonomous vehicle and may influence riders' adoption and reliance of such autonomous vehicles. Additionally, because a driver is no longer present, it may be difficult to interface with the autonomous vehicle and ensure that the passenger's desires are followed by the autonomous vehicle.

DESCRIPTION OF EXAMPLE EMBODIMENTS

Figure 1:
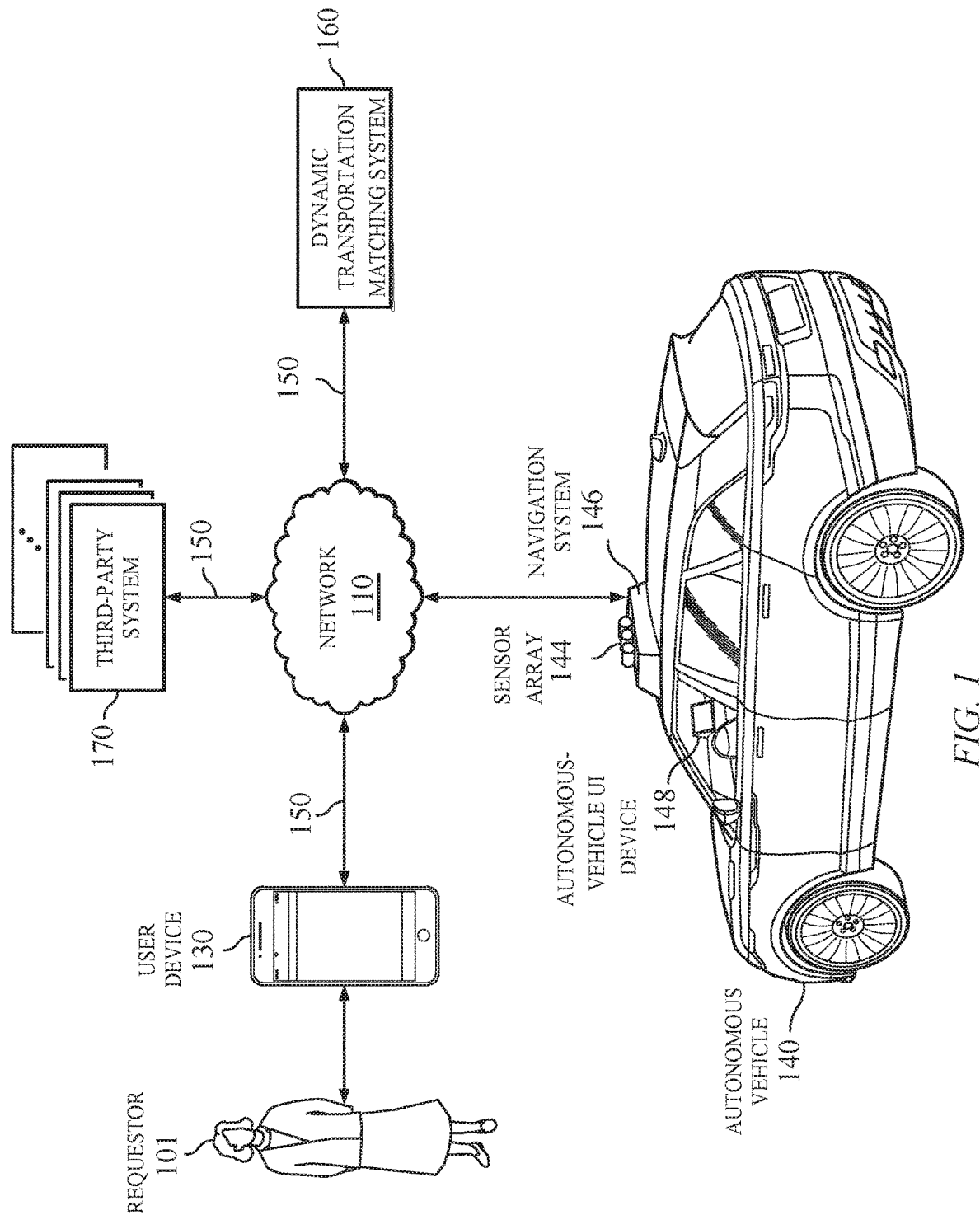
FIG. 1 illustrates an example network environment associated with a dynamic transportation matching system.

Riding in an autonomous vehicle can be disconcerting for some passengers. Because an autonomous vehicle does not have a human driver, a passenger may not realize that the sensing and computing system of the autonomous vehicle help the autonomous vehicle perceive the environment around it, including objects and obstacles in the road. The lack of understanding of what the autonomous vehicle may be perceiving may cause a passenger to become anxious or scared of riding in the autonomous vehicle. Moreover, the lack of control and general unawareness of how the autonomous vehicle is operating may inhibit users from using a dynamic transportation matching system that provides rides using autonomous vehicles. To reduce this fear and promote adoption rates, the dynamic transportation matching system may provide a situational-awareness view during a ride that is displayed on a computing device inside the autonomous vehicle. The situational-awareness view may be displayed on a computing device (e.g., tablet) provided by the dynamic transportation matching system, or alternatively, it may be displayed on the user's personal device. The situational-awareness view may be generated based on autonomous-vehicle sensor data generated by a sensor array of the autonomous vehicle.

However, the autonomous-vehicle sensor data may occasionally provide only a partial representation of an external environment of the autonomous vehicle. For example, a partial representation of the external environment may be caused by a broken or dirty sensor, bad weather, damaged internal wiring, vibrations or impacts due to driving over rough terrain (e.g., dirt roads or potholes), environmental effects (e.g., smoke in the air) or any other suitable reason. As an example and not by way of limitation, a broken sensor on the autonomous vehicle may prevent the autonomous-vehicle sensor data from representing a full view of the external environment. If the autonomous-vehicle sensor data is used by itself with no supplementation, the situational-awareness view may not display a sufficient representation of the external environment. Partial representation of the external environment may include at least the following: (1) a substantially complete representation of the external environment not provided (e.g., the received data supplies information about the ground, but does not contain information about the area above the autonomous vehicle, like the sky); (2) the information may contain an indication that an object exists at a particular location, but the information may not provide a classification for the object; and (3) the received data may briefly cut out, which means that there may be periods of time where no data is being received by the autonomous-vehicle UI device. Incomplete and un-supplemented autonomous-vehicle sensor data may result in a situational-awareness view that jitters, skips frames, omits major details, incorrectly classifies objects, or leaves objects unidentified or unclassified.

To mitigate these and other problems, the computing device in the autonomous vehicle may supplement the autonomous-vehicle sensor data with other secondary data. The secondary data may be user-generated data, map data, inertial and orientation data of the autonomous vehicle, video data from a camera of the dynamic transportation matching system, or any other suitable type of data that can be used to interpret the autonomous-vehicle sensor data. Based on the autonomous-vehicle sensor data and the secondary data, the computing device may make inferences to display a smooth and accurate representation of the external environment in the situational-awareness view. Note that the sensor data is used for making decisions and determining operations by the autonomous vehicle and the secondary data is used to display accurate and relevant information to the user in a situational-awareness view to ensure the passenger is comfortable with the autonomous vehicle experience. Further, the situational-awareness view provides an intuitive and interactive interface for users to understand the environment surrounding the autonomous vehicle, the world as the autonomous-vehicle understands it, and to interface and interact with the autonomous vehicle to ensure a successful ride.

As an example and not by way of limitation, the autonomous-vehicle sensor data may identify an object moving laterally across the sensors in front of the vehicle. But the autonomous-vehicle sensor data may lack information necessary to classify the object due to, for example, a dirty or damaged sensor or temporary changes in the orientation of the sensors (e.g., due to the autonomous vehicle driving over a pothole or hitting a tree branch). The computing device may detect that it has received incomplete data. The computing device may use the available sensor data to make a number of useful determinations, such as the speed of the object, the cadence (or gait, e.g., the manner in which it moves or walks) of its movement, the color of the object, the distance to the object, or any other suitable data. However, it may still lack the data necessary to classify the object and provide an object graphic in the situational-awareness view. As such, the computing device may access secondary data. The secondary data may include data from an inertial measurement unit (IMU) on the autonomous vehicle that is used to determine that the autonomous vehicle is stopped. The secondary data may also include map information that is used to determine that the autonomous vehicle is stopped at a crosswalk.

The computing device may infer, based on the available sensor data and the secondary data that the object moving laterally across the sensors is not a car or other motorized or human-powered vehicle (e.g., cyclist), but is instead a pedestrian or other ambulatory object (e.g., dog) crossing the crosswalk. This determination may have been made using both the incomplete sensor data and secondary data. For example, the available sensor data may have indicated that the object's movement and cadence (or gait, e.g., the manner in which it moves or walks) was more consistent with a pedestrian or other walking object than a car, bicycle, or other vehicle. The secondary data may have included map data and IMU data. The map data may have indicated that the autonomous vehicle was located near a crosswalk. The IMU data may have indicated that the car was stopped. Based on the incomplete sensor data and the secondary data (e.g., the map data and the IMU data), the computing device may detect that the object was moving in a crosswalk while the autonomous vehicle was stopped. Thus, the object is more likely to be a pedestrian or other ambulatory object (e.g., dog) crossing the crosswalk than a car or other motorized or human-powered vehicle (e.g., cyclist).

Further, in some embodiments, the computing device may learn to improve classifications based on crowd-sourced feedback. As an example and not by way of limitation, although the computing device has narrowed down a classification for the object to a couple options, it may still be unable to classify the object to a single object because it still lacks enough information to distinguish the object between a pedestrian, dog, or some other object. In some embodiments, in order to properly classify the object, the computing device may provide instructions to display a prompt on an autonomous-vehicle user interface (UI) device requesting the passenger to input a classification for the object. The prompt may state, "Jenny, help us learn about our environment. The highlighted object is a (A) person crossing the street, (B) dog or other animal, or (C) other." The computing device may accept the user's input as the classification for the object and provide a corresponding object graphic in the appropriate location in the situational-awareness view. The object graphic may be configured to move as the object moves in a natural manner so that the object appears as natural and life-like as possible. Further, this user-generated classification may be used in the future by the computing device to make more accurate automated classifications.

U.S. patent application Ser. No. 15/812,749, entitled "Evaluating and Presenting Pick-Up and Drop-Off Locations in a Situational-Awareness View of an Autonomous Vehicle" and filed 14 Nov. 2017, and U.S. patent application Ser. No. 15/812,636, entitled "Rendering a Situational-Awareness View in an Autonomous-Vehicle Environment" and filed 14 Nov. 2017, are both related to subject matter similar to the subject matter disclosed herein. Both applications are hereby incorporated by reference in their entirety and for all purposes.

FIG. 1 illustrates an example network environment 100 associated with a dynamic transportation matching system. Network environment 100 includes a requestor 101, a user device 130 of a requestor, a dynamic transportation matching system 160, an autonomous vehicle 140, and one or more third-party system 170 connected to each other by a network 110. Herein requestor 101 and user 101 may be used interchangeably. Although FIG. 1 illustrates a particular arrangement of requestor 101, user device 130, dynamic transportation matching system 160, autonomous vehicle 140, third-party system 170, and network 110, this disclosure contemplates any suitable arrangement of requestor 101, user device 130, dynamic transportation matching system 160, autonomous vehicle 140, third-party system 170, and network 110. As an example and not by way of limitation, two or more of user device 130, dynamic transportation matching system 160, autonomous vehicle 140, and third-party system 170 may be connected to each other directly, bypassing network 110. As another example, two or more of user device 130, dynamic transportation matching system 160, autonomous vehicle 140, and third-party system 170 may be physically or logically co-located with each other in whole or in part. Moreover, although FIG. 1 illustrates a particular number of requestors 101, user devices 130, dynamic transportation matching systems 160, autonomous vehicles 140, third-party systems 170, and networks 110, this disclosure contemplates any suitable number of requestors 101, user devices 130, dynamic transportation matching systems 160, autonomous vehicles 140, third-party systems 170, and networks 110. As an example and not by way of limitation, network environment 100 may include multiple requestors 101, user devices 130, dynamic transportation matching systems 160, autonomous-vehicles 140, third-party systems 170, and networks 110.

In particular embodiments, dynamic transportation matching system 160 may include one or more servers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server.

In particular embodiments, dynamic transportation matching system 160 may include one or more data stores. The data stores may be used to store various types of information, including secondary data such as map data, historical data (e.g., data gathered from past rides), inertial and orientation data, and video data from a camera of the dynamic transportation matching system. The historical data may include past classifications made by the computing device during previous rides along the same or similar roads. As an example, the computing device may classify several objects at a particular intersection. Many of these objects may be stationary objects, such as mail boxes, traffic signals, or buildings. The next time the autonomous vehicle approaches this particular intersection, instead of re-processing the autonomous-vehicle sensor data and re-classifying the objects in the intersection, the computing device may access the historical data from the data stores. It may download this information prior to reaching the particular intersection. For example, at the beginning of a ride, the computing device may access and download several classifications that were made during previous rides along the same route. In particular embodiments, the information stored in the data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a user device 130, a dynamic transportation matching system 160, autonomous-vehicle system 140, or a third-party system 170 to manage, retrieve, modify, add, or delete, the information stored in data store 164.

In particular embodiments, user device 130 may be a mobile computing device such as a smartphone, tablet computer, or laptop computer. User device 130 may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or ride-service applications. With ride-service applications, users may connect to a dynamic transportation matching system to request rides to travel from one location to another.

In particular embodiments, autonomous vehicle 140 may be equipped with a sensor array 144, a navigation system 146, and an autonomous-vehicle UI device 148. Autonomous vehicle 140 may be in the full control of dynamic transportation matching system 160, or it may be owned by a third party (e.g. a person or other entity). If owned by a third party, the third party may lend the autonomous vehicle for limited amounts of time to the dynamic transportation matching system 160 for the purpose of providing rides to users. While the autonomous vehicle is being operated by dynamic transportation matching system 160, the autonomous vehicle may share data (e.g. sensor data, navigation data) with dynamic transportation matching system 160. Sensor array 144 may capture the autonomous-vehicle sensor data in any suitable manner. Autonomous-vehicle sensor data may be captured by any suitable sensor arrangement, such as a Light Detection and Ranging (LIDAR) sensor array of multiple LIDAR transceivers that are configured to rotate 360° around the autonomous vehicle. In particular embodiments, LIDAR transmitting signals may be steered by use of a gated light valve, which may be a MEMs device that directs a light beam using the principle of light diffraction. Such a device may not use a gimbaled mirror to steer light beams in 360° around the autonomous vehicle. Rather, the gated light valve may direct the light beam into one of several optical fibers, which may be arranged such that the light beam may be directed to many discrete positions around the autonomous vehicle. Thus, data may be captured in 360° around the autonomous vehicle, but no rotating parts may be necessary. This disclosure contemplates any suitable LIDAR or other sensing system for sensor array 144.

In particular embodiments, the autonomous-vehicle sensor data may be data that is gathered by sensor array 144. The autonomous-vehicle sensor data may also be referred to herein as primary data. The primary data may be the data that the autonomous vehicle 140 primarily uses to perceive its environment. In particular embodiments, the primary data may take the form of LIDAR data, optical images, RF data, or any other suitable type of data. Data that comes from other systems outside of sensor array 144 may be referred to herein as secondary data. The secondary data may include, for example, IMU data, GPS data, historical data (e.g., past classifications made during previous rides along the same or similar roads), map data, weather data, data gathered from recording device 510 of FIG. 5, or any other suitable data source associated with embodiments as described herein.

The autonomous-vehicle sensor data may come in one of two forms: (1) as a list of coordinate points, or (2) as pre-classified point sets. If the autonomous-vehicle sensor data is a list of coordinate points, this may be considered raw data. The coordinate points may correspond to locations where a LIDAR laser hit the surface of an object in the external environment. Each point may have an x, y, and z component. Based on the x, y, and z components of the points, the autonomous-vehicle UI device may identify subsets of data points. Each subset may correspond to an object in the external environment. The process by which the autonomous-vehicle UI device identifies subsets is discussed below.

In particular embodiments, the autonomous-vehicle sensor data may be received as pre-classified point sets. For example, the point sets may include both the data points and a classification for the data points as determined by a processor associated with sensor array 144. For example, a point set associated with an object in the environment may be classified as a car, or may be classified more specifically, such as a HONDA ACCORD if the characteristics of the object are able to be identified in enough detail to differentiate other cars. In particular embodiments, the pre-classified point sets may also be associated with confidence scores. These confidence scores may be assigned by a processor associated with sensor array 144 and may represent the probability that the classification is correct. In particular embodiments, if the confidence score is high enough, a computing device may simply accept the classification as correct and provide instructions to render the corresponding graphical representation in the situational-awareness view. However, in many cases the confidence score may be low because of a damaged, dirty, or disoriented sensor. As such, the computing device (e.g., autonomous-vehicle UI device or another computing device or combination of computing devices associated with autonomous vehicle 140) may re-classify the object based on secondary data and/or calculate another confidence score for the classification based on secondary data and/or by using a machine-learning model, as discussed herein. This disclosure contemplates any suitable computing device to carry out the embodiments described herein. The computing device may be autonomous-vehicle UI device 148, may be navigation system 146, or may be any other suitable computing device or combination of multiple devices associated with autonomous vehicle 140.

If the autonomous-vehicle sensor data is delivered as point sets with classifications and associated confidence scores, the computing device may not need to process the data and classify the objects, because the objects may be received as being previously classified. For example, the autonomous-vehicle UI device may receive a point set that has been classified as a car from a processor associated with sensor array 144. The point set may include a location, an orientation in relation to the autonomous vehicle, and a velocity of the object represented by the point set. For example, the point set may be associated with classification information including that the object is a car traveling at 45 miles per hour toward autonomous vehicle 140 on the opposite side of the road. As such, the autonomous-vehicle UI device may present a graphic of a car traveling toward the autonomous vehicle at 45 miles per hour on the opposite side of the road in the situational awareness view.

In particular embodiments, the computing device may receive a "footprint" of an object instead of its classification. For example, a footprint may be provided for an object that is far away and where characteristics of the object are difficult to detect. However, the size of the object may be determined. Accordingly, the footprint may be the ground area covered by the object. In particular embodiments, the footprint may include the ground area and the height of the object. The autonomous-vehicle UI device may make an inference of the object type based on the footprint. For example, the autonomous-vehicle sensor data may indicate that an object with a footprint of 50 feet by 8.5 feet is present at a particular location in the environment. From the footprint, the autonomous-vehicle UI device may infer that the object is a semi-trailer truck. Thus, the autonomous-vehicle UI device may classify the object as a semi-trailer truck and present a graphic of a semi-trailer truck in the situational awareness view.

The autonomous-vehicle sensor data may represent a three-dimensional schema of the external environment of the autonomous vehicle. As an example and not by way of limitation, the three-dimensional schema may represent the external environment including objects such as other cars and pedestrians up to a maximum range of the sensor arrangement (e.g., 100 meters). In particular embodiments, at least some of the autonomous-vehicle sensor data may be classified to include references to objects that are within a threshold distance from the autonomous vehicle.

Although sensor array 144 appear in a particular location on autonomous vehicle 140 in FIG. 1, sensor array 144 may be located in any suitable location in or on autonomous vehicle 140. Example locations for sensors include the front and rear bumpers, the doors, the front windshield, on the side paneling, or any other suitable location. In particular embodiments, navigation system 146 may be any suitable autonomous navigation system, such as a navigation system based at least in part on a Global Positioning System (GPS) module, inertial measurement unit (IMU), LIDAR sensors, optical cameras, radio frequency (RF) transceivers, or any other suitable data gathering mechanism. Navigation system 146 may use map data and autonomous-vehicle sensor data to guide the autonomous vehicle to its destinations without colliding into other objects. Although navigation system 146 appears in a particular location on autonomous vehicle 140 in FIG. 1, navigation system 146 may be located in any suitable location in or on autonomous vehicle 140. Example locations for navigation system 146 include inside the cabin of autonomous vehicle 140, near the engine/battery, near the front seats, rear seats, or in any other suitable location. Although this disclosure describes a particular autonomous vehicle having a particular set of features (e.g. sensors, navigation system, dynamic transportation matching system computing device), this disclosure contemplates any suitable autonomous vehicle having any suitable set of features.

In particular embodiments, autonomous-vehicle user interface (UI) device 148 may be a tablet or other suitable device associated with dynamic transportation matching system 160 to allow the user to interact with the autonomous vehicle 140, dynamic transportation matching system 160, other users 101, or a third-party 170. In particular embodiments, an autonomous-vehicle UI device may be any suitable computing device such as a tablet, and may be associated with dynamic transportation matching system 160. For example, the autonomous-vehicle UI device 148 may have a software application associated with dynamic transportation matching system 160 installed on the device 148. Although a single autonomous-vehicle UI device 148 is illustrated in a particular location in autonomous vehicle 140 of FIG. 1, autonomous vehicle 140 may include several autonomous-vehicle UI devices 148 in several different locations within the vehicle. As an example and not by way of limitation, autonomous vehicle 140 may include four autonomous-vehicle UI devices 148 located in front of the front-left passenger seat (e.g. driver's seat in traditional U.S. automobiles), in front of the front-right passenger seat, in front of the rear-left passenger seat, and in front of the rear-right passenger seat. In particular embodiments, autonomous-vehicle UI device 148 may be detachable from any component of autonomous vehicle 140. This may allow users to handle autonomous-vehicle UI device 148 in a manner consistent with other tablet computing devices. As an example and not by way of limitation, a user may move autonomous-vehicle UI device 148 to any location in the cabin of autonomous vehicle 140, may hold autonomous-vehicle UI device 148 in their lap, or handle autonomous-vehicle UI device 148 in any other suitable manner.

In particular embodiments, autonomous-vehicle UI device 148 may include a display screen that is configured to display a situational-awareness view of a current environment of autonomous vehicle 140. In particular embodiments, the situational-awareness view may be presented by a projector that projects the situational-awareness view onto one or more surfaces in the autonomous vehicle 140. Surfaces may include, for example, a front windshield or side windows. In some embodiments, the projection may operate similarly to a heads-up display, where the images are perceived as holograms.

Figure 3:
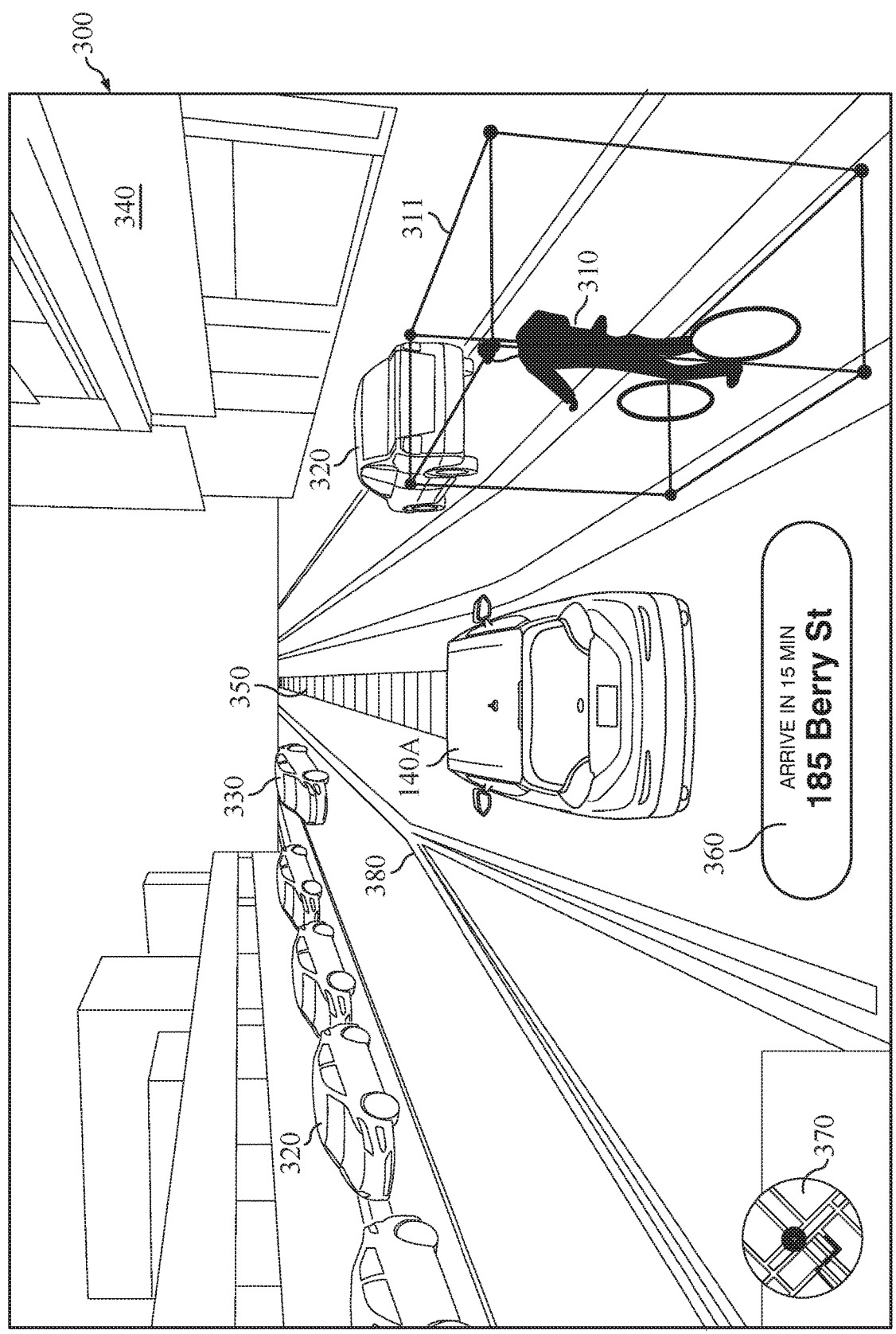
FIG. 3 illustrates an example graphical interface for displaying a real-time situational-awareness view associated with an autonomous ride.
Figure 5:
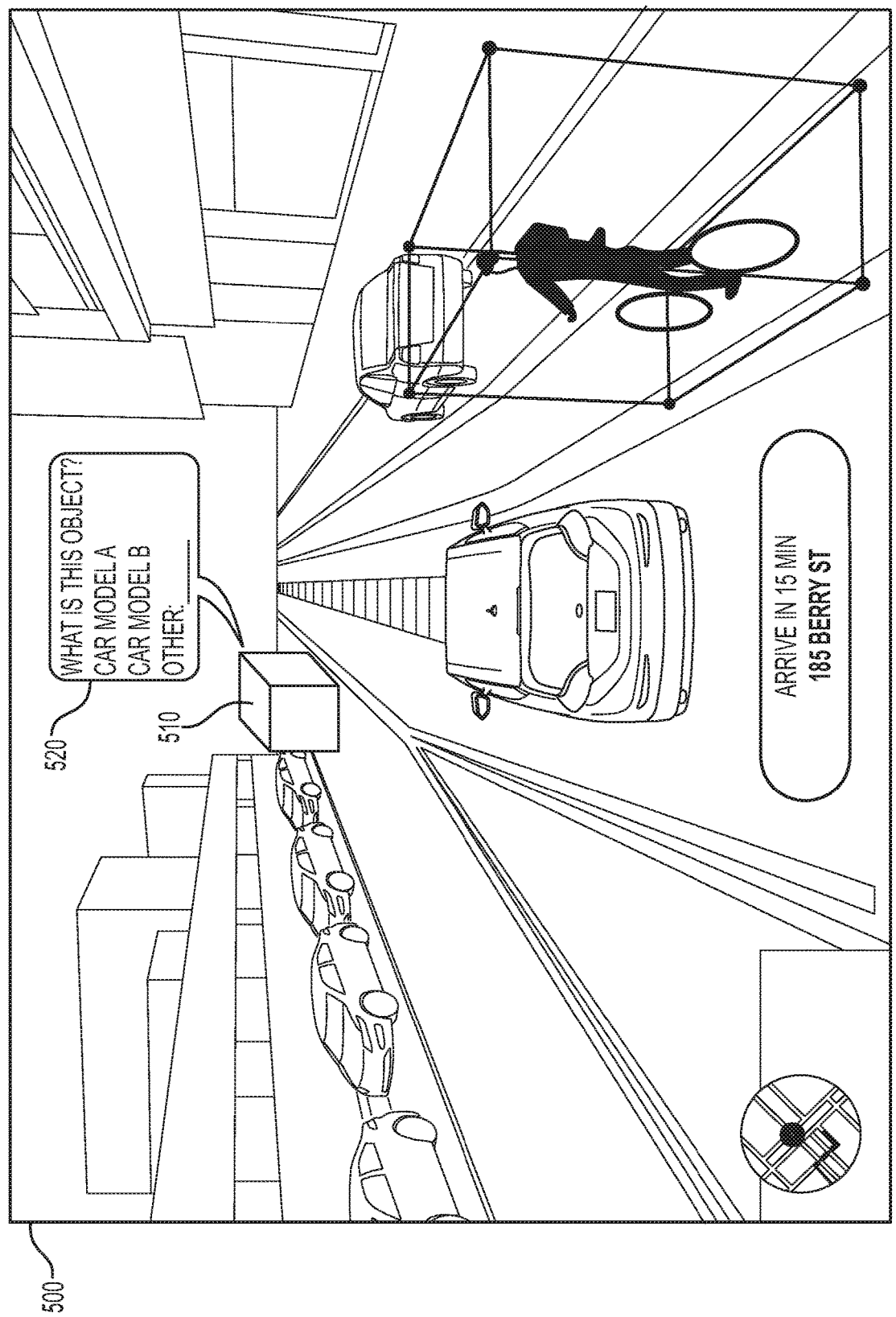
FIG. 5 illustrates an example user interface for gathering secondary information.

A situational-awareness view may be a representation of an environment of the autonomous vehicle that is updated in real time. For example, FIGS. 3 and 5 show example situational-awareness views. In a situational-awareness view, graphical representations of objects that exist in the external environment of the autonomous vehicle may be displayed on the display screen of autonomous-vehicle UI device 148. As an example and not by way of limitation, autonomous vehicle 140 may be driving along a city street. Autonomous vehicle 140 may approach a traffic signal that changes from green, to yellow, to red. After the light changes to red, several pedestrians may cross the street in front of autonomous vehicle 140. Autonomous-vehicle UI device 148 may display a situational-awareness view that includes graphical representations of the traffic signal, the pedestrians, and any other objects (e.g. cars, street signs) within a threshold proximity of sensor array 144 (e.g. 100 meters). To render the situational-awareness view, one or more computing devices associated with autonomous vehicle 140 may use autonomous-vehicle sensor data, and in particular embodiments, secondary data such as map data in addition to the autonomous-vehicle sensor data. The map data may be obtained from a third-party system 170 or may be generated by the dynamic transportation matching system 160. The map data may be stored by the autonomous-vehicle UI device prior to a given ride and/or may be periodically updated for a neighborhood, city, region, etc. This may enable faster processing by the autonomous-vehicle UI device because there may not be a need to access a third-party system 170 during a given ride.

In particular embodiments, autonomous-vehicle UI device 148 may have an interactive touchscreen display and one or more other input/output (I/O) interfaces (e.g. a microphone). The display of autonomous-vehicle UI device 148 may be operable to receive rider input via a touchscreen in the form of taps on the touchscreen or via a microphone in the form of voice commands. Users 101 of the ride service may interface with autonomous-vehicle 140 by interfacing with autonomous-vehicle UI device 148 to obtain information (e.g. ETA, ride length, current location, nearby attractions), input commands to the autonomous vehicle (e.g. set a new destination, end the current ride, pick up another passenger, view information related to nearby attractions, view payment information), or perform any other suitable interaction. In particular embodiments, instead of using ride-service computing system 148 to view and interact with autonomous vehicle 140 or dynamic transportation matching system 160, the user may use their own user device 130. In particular embodiments, the situational-awareness view may be rendered on user device 130 as it is received from a computing device associated with autonomous vehicle 140 via a wired or wireless transmission such as Bluetooth or Wi-Fi. For example, a computing device of the autonomous vehicle may generate the situational-awareness view and may stream the generated view to the user device 130 over a wireless connection (e.g., Bluetooth, Wi-Fi, etc.).

Dynamic transportation matching system 160 may be accessed by the other components of network environment 100 either directly or via network 110. In particular embodiments, dynamic transportation matching system 160 may include an authorization server (or other suitable component(s)) that allows users 101 to opt in to or opt out of having their actions logged by dynamic transportation matching system 160 or shared with other systems (e.g. third-party systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of dynamic transportation matching system 30 through blocking, data hashing, anonymization, or other suitable techniques as appropriate.

In particular embodiments, third-party system 170 may be a network-addressable computing system that can host GPS maps, customer reviews, weather information, or any other suitable type of information. Third-party system 170 may generate, store, receive, and send relevant data, such as, for example, map data, customer review data from a customer review website (e.g. YELP), weather data, or any other suitable type of data. Third-party system 170 may be accessed by the other components of network environment 100 either directly or via network 110. In particular embodiments, one or more users 101 may use one or more user devices 130 to access, send data to, and receive data from dynamic transportation matching system 160 or third-party system 170. User device 130 may access dynamic transportation matching system 160 or third-party system 170 directly, via network 110, or via a third-party system. As an example and not by way of limitation, user device 130 may access third-party system 170 via dynamic transportation matching system 160. User device 130 may be any suitable computing device, such as, for example, a personal computer, a laptop computer, a cellular telephone, a smartphone, a tablet computer, or an augmented/virtual reality device.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect user device 130, dynamic transportation matching system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
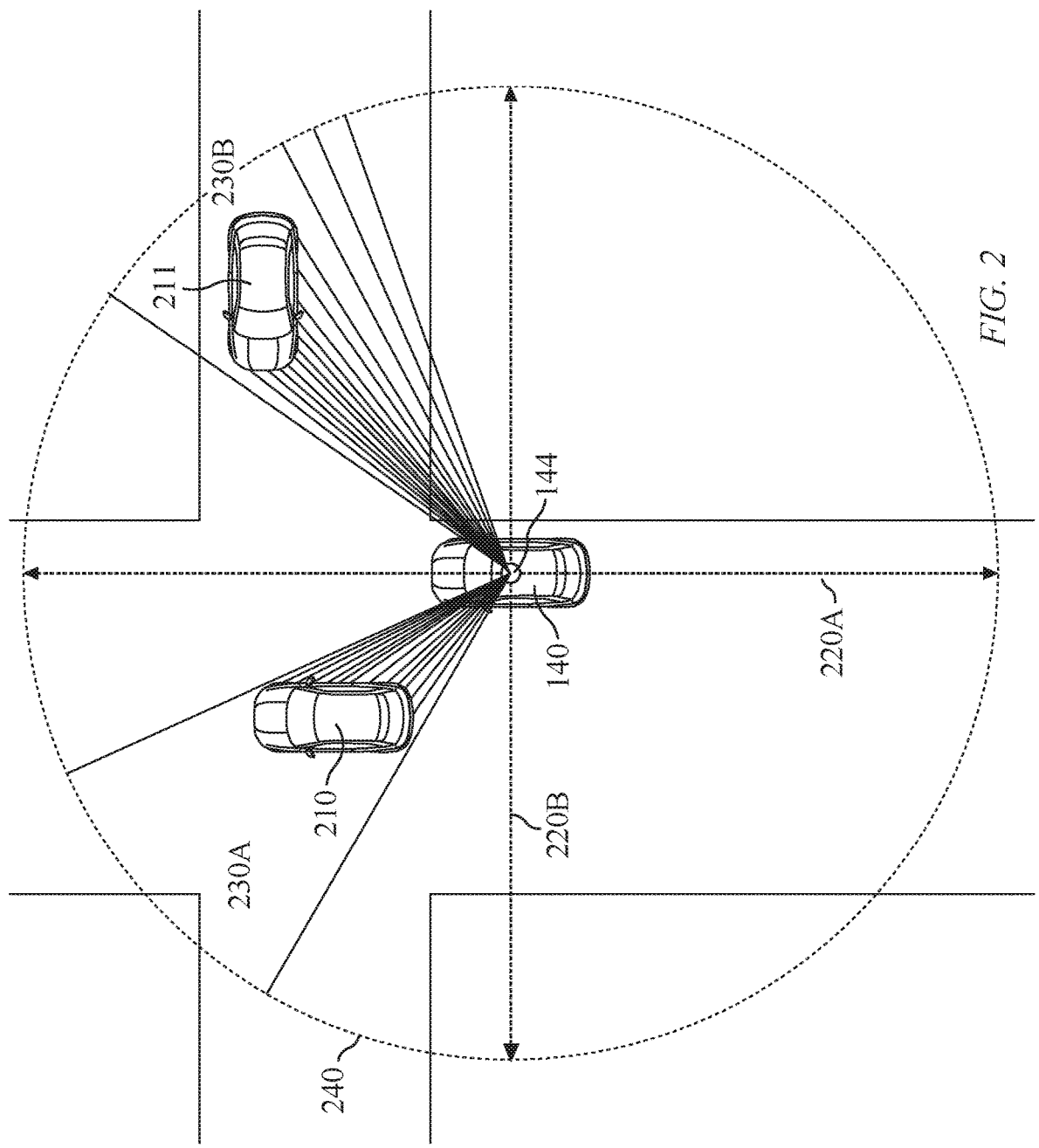
FIG. 2 illustrates an example driving environment of an example autonomous vehicle.

FIG. 2 illustrates an example driving environment of an example autonomous vehicle 140. In particular embodiments, a computing device associated with autonomous vehicle 140 or dynamic transportation matching system 160 may receive autonomous-vehicle sensor data that represents an external environment within a threshold distance of autonomous vehicle 140. In particular embodiments, the computing device may be autonomous-vehicle UI device 148, may be navigation system 146, or may be any other suitable computing device associated with autonomous vehicle 140. The autonomous-vehicle sensor data may be collected via sensor array 144 arranged on the outside or the inside of autonomous vehicle 140. The autonomous-vehicle sensor data may enable autonomous vehicle 140 to identify objects in the surrounding external environment, such as cars 210 and 211. The sensor array 144 is configured to measure the distance of objects relative to the position of the autonomous vehicle in three dimensions. These measurements are used in the generation of the autonomous-vehicle sensor data which may enable autonomous vehicle 140 to identify the road upon which it is driving, lanes in the road, other vehicles, pedestrians, cyclists, traffic signals, buildings, or any other suitable object. Alternatively or in addition, the road, lanes and other road markings may be identified with map data. As an example and not by way of limitation, sensor array 144 may include LIDAR sensors. LIDAR systems measure how far away a physical surface in a 3D space is from the emitting device, as well as the direction to that surface, which allows for the creation of a full 3D model of the world around the sensor. The basic method of operation of a LIDAR system may be to transmit a beam of light, and then measure the returning signal when the light reflects off of an object. The time that the reflected signal takes to come back to the LIDAR module may provide a direct measurement of the distance to the object. Additional information about the object, like its velocity or material composition, may also be determined by measuring certain properties of the reflected signal, such as for example the induced Doppler shift. Finally, by steering this transmitted light, many different points of an environment may be measured to create a detailed 3D model.

The LIDAR sensors may include LIDAR transceivers that rotate 360°. Alternatively, LIDAR transmitting signals may be steered by use of a gated light valve, which may be a MEMs device that steers a light beam using the principle of light diffraction. The LIDAR sensors may transmit light beams 230A and 230B in multiple directions around autonomous vehicle 140 within a distance 240, which may be the range of the sensors. As an example and not by way of limitation, the LIDAR sensors may transmit laser beams in any direction in a reference coordinate system having an x-direction 220B and a y-direction 220A. In particular embodiments, the reference coordinate system may also have a z-direction (not shown). Differences in laser return times and wavelengths may be used to obtain coordinate information associated with the external environment of autonomous vehicle 140. In particular embodiments, the coordinate information may comprise distance information. The coordinate information may include a list of coordinate points (e.g. x, y, z coordinates) that represent locations where a LIDAR laser hit the surface of an object. In particular embodiments, based on the coordinate information, a three-dimensional representation may be generated for use by autonomous vehicle 140. In particular embodiments, the coordinate points may also comprise a time component t which may represent the time that a LIDAR beam took to be transmitted from the transceiver, hit an object, and then be received by the transceivers. Autonomous vehicle 140 may use the time component of the coordinate points to determine a real-time three-dimensional representation of its external environment.

In particular embodiments, the autonomous-vehicle sensor data may be "stitched" together with secondary data to return a full representation of the external environment. Data stitching may be appropriate when there are missing pieces from the autonomous-vehicle sensor data such that the sensor data does not represent an accurate depiction of objects within the external environment. As an example and not by way of limitation, the received autonomous-vehicle sensor data may supply information about the external environment up to a particular angle (e.g., 20 degrees above horizontal). This information may identify the ground and objects on the ground, but may not include information about objects above the particular angle. Thus, the autonomous-vehicle sensor data may exclude information about objects above the autonomous vehicle 140, such as taller buildings, billboards, overhead construction, clouds, etc. To supplement the incomplete data, the autonomous-vehicle UI device may access secondary data associated with the type of data that is missing from the sensor data. For example, the autonomous-vehicle UI device may access weather data to determine if it is cloudy or sunny. The autonomous-vehicle UI device may then stitch together the autonomous-vehicle sensor data with the weather data to provide an accurate situational-awareness view that includes both an accurate representation of objects on the ground and an accurate representation of the sky. In particular embodiments, particular data sources may be better suited to provide particular information for rendering different types of graphics. For example, autonomous-vehicle sensor data may be a suitable data source to provide information to render object graphics that correspond to objects such as cars and pedestrians. However, weather data may be used for weather related overlay graphics, map data may provide information to render object graphics that correspond to buildings and traffic signals, and image data may be used to identify street lanes in the road.

As an example of how sensor array 144 and autonomous vehicle 140 detects objects in the environment, consider cars 210 and 211 and the example series of light beams 230A and 230B for particular segments of the surrounding environment. This disclosure contemplates that light beams that are emitted in multiple directions surrounding autonomous vehicle 140 and the example series of light beams 230A and 230B are meant for illustrative purposes only. After the series of light beams are emitted, at least some of them will be reflected back off of surrounding objects, such as cars 210 and 211 and will be received by a receiving sensor of the sensor array 144 of autonomous vehicle 140. Other light beams will be reflected back off of objects that are farther away, such as buildings or trees. Still other light beams may not be reflected back at all, such as light beams emitted toward the sky. The computing device may be configured to convert the reflected light beams into data points with x, y, and z components. In particular embodiments, the data points may take the form of a 3D point cloud. The 3D point cloud may contain subsets of data points that each correspond to an object in the environment (e.g., cars 210 and 211). The task for the computing device (e.g., autonomous-vehicle UI device or another computing device or combination of computing devices associated with autonomous vehicle 140) is to identify and accurately classify these subsets of data points. The computing device may be able to classify an object based on the x, y, and z components of the data points in the subset. For example, the subset of data points may match a predetermined pattern that corresponds to a car. Because the subset matches the predetermined pattern, the subset may be classified as a car. But sometimes it may not be possible to classify the subset because the subset is missing too many data points to make an accurate classification, or because the subset resembles two (or more) different objects. As an example and not by way of limitation, a subset of data points may be missing half of the expected data points. For this reason, the subset may resemble both a motorcycle and the front-left corner of a car (e.g., of car 211). The computing device may be unable to determine from the subset of data points alone whether the object is a motorcycle or a car.

To be able to make a better estimate of what the subset of data points represents in the real world, the computing device may take secondary data, along with the subset of data points, as input to a machine-learning model. To continue the above example of the subset of data points that resembles both a motorcycle and a car, the secondary data may include two categories of data: GPS data, and weather data. The GPS data may indicate that the subset of data points was captured in Buffalo, N.Y. The weather data may indicate that it was snowing when the subset of data points was captured. The machine-learning model may take this input data and output a confidence score for each of the classifications. The confidence score may indicate the probability of the classification being correct. For example, the confidence score for the motorcycle classification may be 0.45, and the confidence score for the car classification may be 0.78. Thus, it's more likely that the subset corresponds to a car than a motorcycle. The computing device may classify the subset as a car and provide instructions to render an object graphic that looks like a car in the situational-awareness view. This classification makes sense because a car is more likely to be driving in snow than a motorcycle. A more detailed discussion of this process is included with reference to FIG. 6 below.

FIG. 3 illustrates an example graphical interface 300 for displaying a real-time situational-awareness view associated with an autonomous ride. Graphical interface 300 may include a graphic representation of at least some of the autonomous-vehicle sensor data, map data, and third-party data (e.g., weather data). The graphical interface may be displayed by the autonomous-vehicle UI device 148 or may be displayed on the user device 130. Graphical interface 300 may display a situational-awareness view that includes one or more road graphics, one or more object graphics, and one or more overlay graphics. Object graphics may be graphical representations of objects within a threshold distance of the autonomous vehicle 140. Road graphics may be graphical representations of the roads on which autonomous vehicle 140 navigates. Overlay graphics may be graphical or textual representations of information related to the user, ride, objects, buildings, streets, cities, autonomous vehicle 140, or any other suitable object in the situational awareness view. Two examples of overlay graphics are a route indicator and a destination address. The different graphic representations may be combined to help a passenger to both understand the autonomous-vehicle sensor data being gathered by sensor array 144 and how the autonomous-vehicle information interprets the data. When a passenger observes that the situational-awareness view contains objects that are shown in the actual environment surrounding the vehicle, they may be put at ease and have a more enjoyable ride.

In particular embodiments, the object graphics may represent an object within a threshold distance of the autonomous vehicle as detected at least in part by one or more of the sensors on sensor array 144 of the autonomous vehicle. The threshold distance may be determined based on the range of sensor array 144, or may be determined by dynamic transportation matching system 160. As an example and not by way of limitation, the range of sensor array 144 may be 100 meters. However, rendering an object graphic for every detected object within 100 meters of autonomous vehicle 140 may place a high burden on the processing power of the computing device and may also overwhelm the user. Therefore, it may be desirable to render only those object graphics that correspond to objects closer to autonomous vehicle 140 than the range of the sensor array 144. Examples of object graphics include graphics associated with stationary objects 320 (e.g. parked cars, traffic signs or signals, mailboxes), graphics associated with objects capable of immediate movement 330, 310 (e.g. moving cars, bicyclists, pedestrians, runners), a graphic associated with autonomous vehicle 140 (e.g., as shown by element 140A in FIG. 3), or any other suitable graphic associated with objects that may come into the range of sensor array 144 of autonomous vehicle 140.

The computing device may provide different indications depending on the type of object. For example, the cyclist 310 of FIG. 3 is darker and bolder than the other object graphics in FIG. 3. This may be because a passenger may be more concerned with cyclist 310 than other objects in the environment. Cyclist 310 is sharing the same road as the autonomous vehicle and is close to the autonomous vehicle, which may cause the passenger to be concerned about the autonomous vehicle hitting the cyclist. To alleviate this concern, the situational-awareness view may embolden the graphic for the cyclist to highlight to the passenger that the autonomous vehicle has identified and aware of the cyclist. In particular embodiments, an object graphic may include a graphical indication that the corresponding detected object is moving (e.g., by displaying a bounding box 311 around a cyclist 310). This may give the user an added measure of comfort to know that autonomous vehicle 140 is aware of both the object and a space immediately surrounding the object. This may help to overcome the uneasiness that passengers may feel when riding in an autonomous vehicle.

In particular embodiments, graphical interface 300 may display a situational-awareness view that includes one or more road graphics. A road graphic may represent a road on which autonomous vehicle 140 may drive. Examples of road graphics include graphics associated with any roads and intersections that are within range of the sensor array 144 of autonomous vehicle 140, street markings 380 (e.g., lane indicators), curbs, or any other suitable graphic associated with the roads on which autonomous vehicle 140 drives. A road graphic may be rendered in the situational awareness view as extending farther away than the object graphics are rendered such that the road objects may be shown even when not yet sensed by the sensor array 144 or when outside the displayable range for object graphics within the situational-awareness view. This may be because a user may wish to see any given road graphic as far into the situational-awareness view as possible. This may result in the road graphic being displayed and then one or more object graphics being rendered and appearing on the road graphic as autonomous vehicle 140 navigates down a road. In particular embodiments, more than one road graphics may be included in the situational-awareness view. As an example and not by way of limitation, autonomous vehicle 140 may approach an intersection, and the situational-awareness view may include both a road object corresponding to the road that autonomous vehicle 140 is driving on as well as a road object corresponding to the road that autonomous vehicle 140 is approaching. In particular embodiments, the data for the road graphics may come from map data. The map data may be retrieved by the computing device and may be used to render road graphics. This may save computing resources because the autonomous-vehicle sensor data may be used to identify objects instead of render road graphics.

In particular embodiments, graphical interface 300 may display a situational-awareness view that includes one or more overlay graphics. An overlay graphic may provide particular information associated with one or more aspects of autonomous vehicle 140, user 101, the ride user 101 is currently taking, object graphics, road graphics, a current route of autonomous vehicle 140, or any other suitable information. Examples of overlay graphics include route indicator 350 (which may display the current route of the autonomous vehicle for the current ride), destination indicator interface element 360 (which may display information about the destination such as miles remaining until destination is reached, or estimated time of arrival), and map toggle interface element 370 (which may display an alternate situational-awareness view that is a top-down view instead of a behind-the-vehicle view as illustrated by FIG. 3). Other examples of overlay graphics that are not illustrated in FIG. 3 but nevertheless contemplated by this disclosure include information related to detected objects corresponding to object graphics (e.g., speed of an object, type of object, etc.), a music playlist of user 101, information related to detected roads corresponding to road graphics (e.g., street names, traffic conditions, etc.), or any other suitable information. As an example and not by way of limitation, the computing devices may incorporate information related to nearby businesses and attractions from third-party applications such as YELP, GOOGLE MAPS, or other map-based databases. Continuing with this example, during a ride, autonomous vehicle 140 may drive on Webster Street in San Francisco, Calif. The situational-awareness view may display buildings as object graphics or as a combination of object graphics and corresponding map data or 3rd party data. For example, the autonomous-vehicle sensor data may indicate that the surface of a particular building is made of glass. This may be determined because the reflected light beam may be dimmer than the transmitted light beam. This means that some of the light went through the surface of the object instead of being reflected back. This would indicate that the surface is glass. The computing device may then determine from map data that the building is called "ABC Building." In the situational-awareness view, there may be displayed a graphic that represents the building and is made to look like glass and have the title "ABC Building." These object graphics may correspond to actual buildings in the external environment of autonomous vehicle 140. One of the object graphics displayed in the situational-awareness view may be a building that represents the restaurant ABC Ramen Restaurant. The situational-awareness view may include the name of the restaurant as an overlay graphic that overlays the object graphic representing the building where ABC Ramen Restaurant is located. In particular embodiments, additional information related to the restaurant may be displayed, including hours of operation, current wait time, customer reviews, a menu, a web resource (e.g., a link to the restaurant's website or to a third party reservations application such as OPEN TABLE), a phone number, or any other suitable information.

In particular embodiments, at least some of the object graphics, the road graphics, and the overlay graphics may be interactive. As an example and not by way of limitation, if the user taps on the graphical rendering 140A of autonomous vehicle 140, information related to autonomous vehicle 140 may be displayed, such as the make, model, year, the battery or fuel level, the number of miles driven that day, week, month, or during the lifetime of autonomous vehicle 140, or any other suitable information. As another example and not by way of limitation, if the user taps on map toggle interface element 370, a larger-sized map may be displayed on the display screen. The user may then be able to interact with the map in any suitable manner (e.g., change a destination, route to the destination, etc.). As another example and not by way of limitation, if the user taps on destination indicator interface element 360, information about the destination may be displayed, such as miles remaining until destination is reached, or estimated time of arrival. The user may be able to set a new destination, see information related to the destination, or view any other suitable information.

As discussed previously, the graphical representations in graphical interface 300 may be determined in part based on secondary data associated with the autonomous vehicle or the autonomous-vehicle sensor data. Autonomous-vehicle sensor data may be data gathered by sensor array 144. Data gathered from a different source may be secondary data. Examples of secondary data include: map data, historical data, video data from a camera of the dynamic transportation matching system, and user-generated data. The computing device may use some or all of these categories of secondary data either by themselves or in conjunction with a machine-learning model to determine a confidence score for identified subsets of data points. Each of these categories of secondary data will be discussed in turn. This disclosure contemplates other types of secondary data in addition to those discussed in detail below, such as GPS data, inertial movement and acceleration data from an inertial measurement unit (IMU), weather data, or any other suitable type of data.

In particular embodiments, the secondary data may be map data. The map data may be associated with the external environment of autonomous vehicle 140. Map data may provide information about street names and street locations, traffic law information (e.g., whether a particular lane is right-turn-only), traffic congestion information, and any other suitable information. The map data may be generated by a third-party (e.g. GOOGLE, DEEPMAP) and may be accessed by the computing device via an application program interface (API). Alternatively, the map data may be generated by dynamic transportation matching system 160. The map data may be stored by the autonomous-vehicle UI device prior to a given ride. This may enable faster processing by the autonomous-vehicle UI device because there may not be a need to access a third-party system 170 during a given ride. Autonomous vehicle 140 (e.g. via navigation system 146) may use the map data to determine one or more routes to navigate from an origin to a destination. In particular embodiments, the map data may comprise traffic data. The traffic data may indicate which routes have more or less traffic. Generally, more traffic may result in slower routes, so it may be desirable for autonomous vehicle 140 to take routes that have less traffic. In particular embodiments, the map data may be highly precise, offering data that is accurate to within 5-10 centimeters. This may mean that the map data may provide highly accurate road dimensions, so that if the autonomous-vehicle sensor data does not provide information for the location of the side of a road (e.g., where the curb or roadside is located), this information may be retrieved from the map data. The autonomous-vehicle UI device may combine this data with GPS data of autonomous vehicle 140 to determine a location of the autonomous vehicle 140 with respect to the side of the road. The autonomous-vehicle UI device may thus render a more accurately located road graphic that represents a curb or roadside.

In particular embodiments, the map data may help the autonomous-vehicle UI device to infer a classification for an identified object. As an example and not by way of limitation, the autonomous-vehicle sensor data may identify an object moving laterally across the sensors. However, the data may lack information necessary to classify the object. The computing device may access secondary data from an inertial measurement unit on the autonomous vehicle to determine that the autonomous vehicle is stopped. The computing device may next access map data from a third party digital map provider and determine that the autonomous vehicle is stopped at a crosswalk. The computing device may infer, based on the distance to the crosswalk, that the object moving laterally across the sensors is a pedestrian, cyclist, or other non-motorized vehicle crossing the crosswalk. This may be because a motorized vehicle such as a car is unlikely to be crossing a crosswalk. This may cause the confidence score for a car classification to decrease.

In particular embodiments, the secondary data may be historical data. Historical data may include previous identifications and classifications of objects along a particular route. When providing rides to requestors 101, dynamic transportation matching system 160 may store the identified and classified objects along a route. As an example and not by way of limitation, the computing device may access information related to rides traveling from San Francisco International Airport (SFO) to Palo Alto, Calif. This information may include the objects that have been identified and classified in previous rides by autonomous vehicles from SFO to Palo Alto. The computing device (e.g., autonomous-vehicle UI device or any other suitable computing device or combination of computing devices) may load at least some of the object graphics that correspond to previously identified and classified objects along the route from SFO to Palo Alto. As the autonomous vehicle 140 navigates along the route, the autonomous-vehicle UI device may display the object graphics in the situational-awareness view. As an example and not by limitation, the route from SFO to Palo Alto may proceed along Highway 101. The computing device may access the GPS coordinates of the billboards along Highway 101. As the autonomous vehicle 140 passes GPS locations corresponding to the billboards, the autonomous-vehicle UI device may display object graphics representing the billboards. The same process may be performed for buildings. This may save significant computing resources because the computing device may not need to process and analyze as much received autonomous-vehicle sensor data in real time. Computing resources can be devoted to identifying and classifying moving objects on the road rather than stationary objects like billboards and buildings. In particular embodiments, the object graphics may be rendered based on map data. For example, the map data may include information about billboards along Highway 101. The computing device may access this map data and provide instructions to render the situational-awareness view with billboards as specified in the map data.

Figure 4:
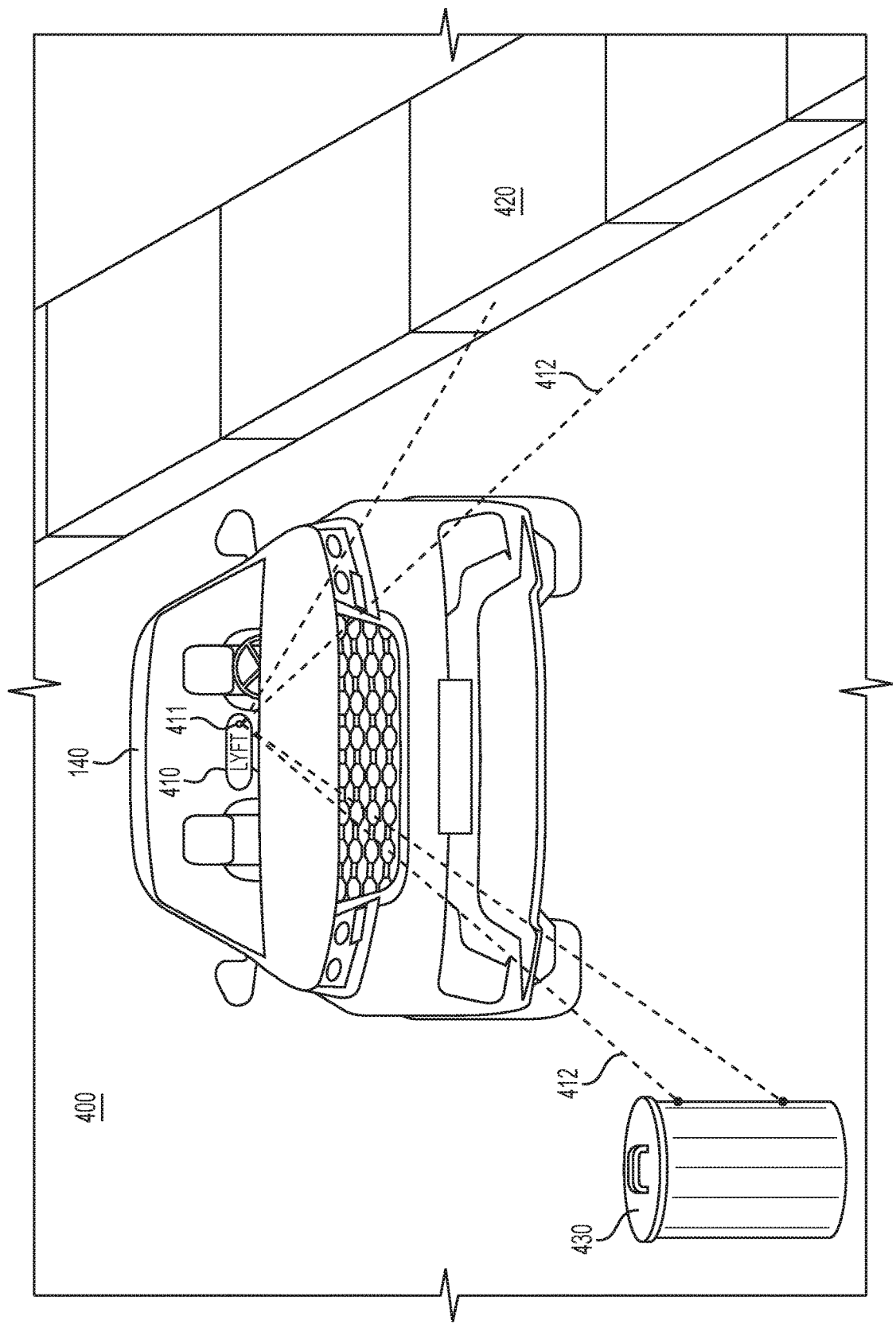
FIG. 4 illustrates an example autonomous vehicle 140 with an example recording device that captures secondary information.

FIG. 4 illustrates an example autonomous vehicle 140 with an example recording device 410 that captures secondary information. In particular embodiments, the secondary data may be video data from a camera associated with a dynamic transportation matching system or other system associated with presenting the situational-awareness view. In some embodiments, the video data may supplemental to the sensor data received and used to initially classify the objects in the environment. Recording device 410 may be an optical recording device or a LIDAR sensing device. Aperture 411 may be a camera lens or may be a LIDAR transceiver and may capture information about the external environment, such as curb 420 or object 430. If the autonomous-vehicle sensor data provides only a partial representation of the external environment, the recording device 410 may supplement the autonomous-vehicle sensor data by capturing the unrepresented portion of the environment. In particular embodiments, partial representation of the external environment may be detected if: (1) a substantially complete representation of the external environment is not provided (e.g., the received data supplies information about the ground, but does not contain information about the area above the autonomous vehicle, like the sky); (2) the information may contain an indication that an object exists at a particular location, but the information may not provide a classification for the object; (3) the information may contain an indication that an object exists at a particular location and a classification for the object, but a confidence score for the classification may be below a threshold level; or (4) the received data may briefly cut out, which means that there may be periods of time where no data is being gathered by sensor array 144. If the recording device is equipped with a LIDAR instrument, the recording device 410 may capture any suitable information by sending light beams 412 in any suitable direction. Although only four light beams 412 are illustrated in FIG. 5, it is contemplated that many more light beams will be emitted from aperture 411. If the recording device 410 is an optical receiver, the recording device 510 may capture any suitable information along lines-of-sight 412, which may be directed in any suitable direction.

The recording device 410 may supplement the autonomous-vehicle sensor data by capturing additional visual information related to an object. As an example and not by way of limitation, the received autonomous-vehicle sensor data may provide an indication that an object exists in front of and to the right of autonomous vehicle 140. However, there may be insufficient data to properly classify the identified object. If the recording device is equipped with a LIDAR sensor, the recording device may gather additional information about the object using the LIDAR sensor. From this additional information, the computing device (e.g., autonomous-vehicle UI device) may determine that the object is a trashcan 430. The autonomous-vehicle UI device may display an object graphic that looks like a trashcan so that the object graphic more accurately represent the external environment. In particular embodiments, the sensor array 144 may provide the autonomous-vehicle sensor data. The sensor array 144 may be more focused on identifying major objects such as cars and pedestrians, but may not focus as much on smaller items like lane dividers, curbs, animals, etc. The recording device 410 may capture information related to smaller items and supplement the autonomous-vehicle sensor data to portray an accurate representation of the surrounding environment to the user through the situational-awareness view. Note that the sensor data is used for making decisions and determining operations by the autonomous vehicle and the secondary data is used to display accurate and relevant information to the user in a situational-awareness view to ensure the passenger is comfortable with the autonomous vehicle experience.

FIG. 5 illustrates an example user interface for gathering secondary information. In particular embodiments, the secondary data may be user-generated data. If the confidence score for a particular classified object is below the threshold, the autonomous-vehicle UI device may send instructions to present a interaction element in the situational-awareness view on the display screen. The interaction element may allow the user to interact with the situational-awareness view by providing information related to the classified object with a below-threshold confidence score. Additionally, the autonomous-vehicle UI device may render the classified object as a block in the situational-awareness view, or alternatively, as a generic object type (e.g., a generic car) or as a generic blob associated with the object coordinate points that have been received. As an example and not by way of limitation, the autonomous-vehicle UI device may classify an identified object as Car Model A (e.g., HONDA CIVIC), but the data associated with the identified object may also resemble Car Model B (e.g., TOYOTA COROLLA). Instead of making a determination based off of moderately unreliable data, the autonomous-vehicle UI device may provide instructions to render the identified object as block 510 and may also provide instructions to present a text module 520 that requests the user to classify the object. For example, the text module 520 may state: "What is this object?" and may provide two or more options for the user to select. The user may also be able to input the name of the object using an "other" category. The user may be able to type or speak the name of the object, which may be entered by the autonomous-vehicle UI device as user input data. Once the user has input the information, the computing device may re-classify the object based on the user-input and give the classification a higher confidence score because it was classified by the user. The computing device may then send instructions to display an appropriate object graphic for the classified object. User-inputted data may be helpful not only in rendering object graphics in a current situational-awareness view, but also in more quickly rendering object graphics in future situational-awareness views. As more and more users input object classifications for identified objects, the computing device may learn (e.g., via machine-learning techniques) the subtle differences between similar-looking objects. For example, the corpus of user identified objects may be used to train a machine learning model to identify objects based on the received sensor information.

Figure 6:
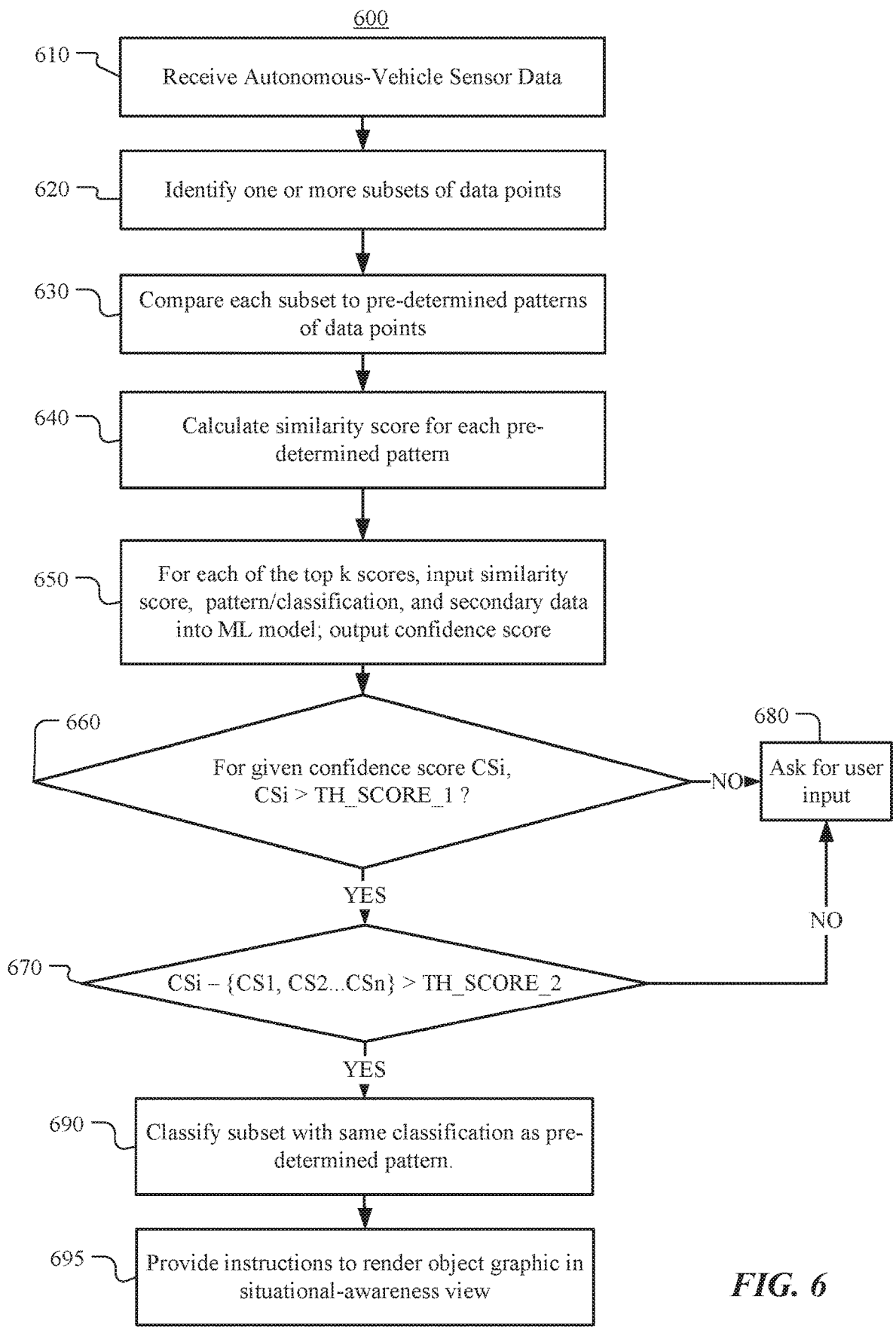
FIG. 6 illustrates an example method for using secondary data to classify and render an identified object.

FIG. 6 illustrates an example method 600 for using secondary data to classify and render an identified object. The method may begin at step 610, where a computing device receives autonomous-vehicle sensor data representing an external environment within a threshold distance of an autonomous vehicle. The computing device may be autonomous-vehicle UI device 148 or may be another suitable computing device or combination of computing devices associated with autonomous vehicle 140 or dynamic transportation matching system 160. The autonomous-vehicle sensor data is generated by sensor array 144 as discussed above with reference to FIG. 2. The autonomous-vehicle sensor data may be a 3D point cloud of data points or may be pre-classified data sets, as discussed above.

At step 620, the computing device may identify, from the autonomous-vehicle sensor data, one or more subsets of data points that each correspond to one or more objects surrounding the vehicle. Each subset may have unique properties by which the computing device can identify it as a subset. As an example and not by way of limitation, at least some of the subset of data points corresponding to car 210 of FIG. 2 may have similar x-components. The same subset may have data points with similar y-components. These data points may correspond to the rear bumper of car 210. The computing device may recognize that because these points have similar components they correspond to an object in the environment. Thus they may be identified as a subset of data points.

In particular embodiments, the received autonomous-vehicle sensor data may contain pre-classified subsets of data points. The pre-classification may have been performed by a processor associated with sensor array 144. If the autonomous-vehicle sensor data is pre-classified, the method may proceed to step 650, where, for each subset, the subset, classification, and secondary data may be input into a machine-learning model, discussed below with references to step 650.

At step 630, the computing device may compare the subset of data points to several predetermined patterns corresponding to different objects (e.g., cars, people, cyclists, traffic signals, mail boxes) as well as different angles of the same object (e.g., the rear-right corner of a car). The patterns may be predetermined, meaning each pattern has been previously determined to correspond to a particular object. For example, there may be six predetermined patterns corresponding to the following objects: car, cyclist, dog, pedestrian, truck, and mailbox. Although only six predetermined patterns are listed here, there may be any number of suitable predetermined patterns.

At step 640, the computing device may calculate a similarity score $SS_i$ for each predetermined pattern based on how similar the respective predetermined pattern is to the subset of data points. The similarity score may be calculated using any suitable method, such as measuring the Euclidean distances between the points in the subset and the points in the predetermined pattern, dividing those distances by the number of points in the subset to determine an average point distance and using the average distance to determine the similarity score. As an example, the average distance between a particular subset and a particular predetermined pattern may be 0.15 meters. This may receive a similarity score of 0.85. The computing device may calculate a similarity score between the subset and each predetermined pattern. As an example, the computing device may calculate six similarity scores $SS_1$ through $SS_6$ that correspond to the six predetermined patterns listed above: 0.85, 0.78, 0.61, 0.43, 0.42, and 0.05.

At step 650, the computing device may identify the top k similarity scores. For each of the top k similarity scores, the computing device may input the similarity score, the corresponding subset of data points, the corresponding predetermined pattern (or, if autonomous-vehicle sensor data is pre-classified, the classification), and secondary data into a machine-learning model. The machine-learning model may be trained using a training set that includes secondary data as sample data and independently classified objects as desired outputs. The independently classified objects may be classified by human users or by an independent computing system. The machine-learning model may output a confidence score $CS_i$ that represents the probability that the predetermined pattern (or, if autonomous-vehicle sensor data is pre-classified, the classification) corresponds to the correct classification for the subset of data points. The following table illustrates example inputs and outputs of the machine-learning model.

| Inputs to ML Model | | | | Output |
|---|---|---|---|---|
| Similarity Score | Pattern | GPS Data | Weather Data | Confidence Score |
| 0.85 | Car | 12.04° S, 77.04° W | Raining | 0.93 |
| 0.78 | Cyclist | 12.04° S, 77.04° W | Raining | 0.55 |
| 0.61 | Pedestrian | 12.04° S, 77.04° W | Raining | 0.42 |

The secondary data in this example may be GPS data and weather data. The GPS data may be the latitude and longitude coordinates of the autonomous vehicle when the autonomous-vehicle sensor data was gathered. The weather data may be the type of weather that was currently hitting the geographic location of the autonomous vehicle when the autonomous-vehicle sensor data was gathered. Only two categories of secondary data were shown in this example for the sake of simplicity. Any number of categories of secondary data may be used by the machine-learning model. As another example, consider the following table:

| Inputs to ML Model | | | | Output |
|---|---|---|---|---|
| Similarity Score | Pattern | Historical Class. | Map Data | Confidence Score |
| 0.85 | Car | 1 | 3 | 0.93 |
| 0.78 | Cyclist | 0 | 3 | 0.55 |
| 0.61 | Pedestrian | 0 | 3 | 0.42 |

Here, the secondary data is historical classification and map data. The historical classification may be a binary indication of whether a majority of the previous classifications within a particular amount of time and under similar circumstances were the same as the respective pattern. Thus, the "1" in the first row indicates that the majority of previously classified objects under similar circumstances were cars. Similar circumstances may be similar geographic region, similar time of day, similar weather conditions, etc. The map data may be a categorization of the type of road the autonomous vehicle was on when the autonomous-vehicle sensor data was captured. For example, "0" may correspond to a freeway, "1" may correspond to a business district roadway, "2" may correspond to a residential street, and "3" may correspond to an intersection. Thus, the "3" in this column means that the autonomous vehicle was at an intersection when the autonomous-vehicle sensor data was captured. The algorithm used by the machine-learning model may be any suitable algorithm, including a linear regression model, a neural network, Bayesian-based model, or any other suitable type of model.

At step 660, the computing device may determine whether the confidence score meets a first condition: it is above a first threshold score. The first condition may ensure that the confidence score is high enough for the classification to be reliable. For example, the first threshold score may be 0.85. Because the confidence score for the car is 0.93, it may meet the first condition. If more than one confidence score meets the first condition, the computing device may simply select the highest confidence score. At step 670, the computing device may determine whether the confidence score meets a second condition: the difference between the confidence score $CS_i$ and every other confidence score $CS_1$, $CS_2, \ldots CS_n$ is above a second threshold score. The second condition may ensure that there is only one classification that is clearly the appropriate classification, because it is better than all the others. For example, the second threshold score may be 0.35. This may mean that the highest confidence score must be at least 0.35 greater than the next highest confidence score. In the example in the tables, the difference between 0.93 and 0.55 is 0.38, which greater than the second threshold score. Likewise, the difference between 0.93 and 0.42 is 0.51, which is also greater than the second threshold score. If more than one confidence score meets the second condition, this may mean that the scores are too similar to make a reliable classification. Thus, the method may proceed to step 680 in this case.

If the above two criteria are true, the method may proceed to step 690, where the computing device classifies the subset with the same classification as the classification for the predetermined pattern (or if the autonomous-vehicle sensor data came pre-classified, the computing device keeps the pre-classification as the classification). Again, if both conditions are met, the method may then proceed to step 695, where the computing device provides instructions to render an object graphic corresponding to the classification in the situational-awareness view. If either of the above two conditions are not true for any of the confidence scores, the method may proceed to step 680. At this step, the computing device may provide instructions to display a prompt on the autonomous-vehicle UI device 148 or client device 130 requesting the passenger to input a classification for the object. As an example and not by way of limitation, the prompt may state, "Jenny, help us learn about our environment. The highlighted object is a (A) a car, (B) a dumpster, or (C) other."

Figure 7:
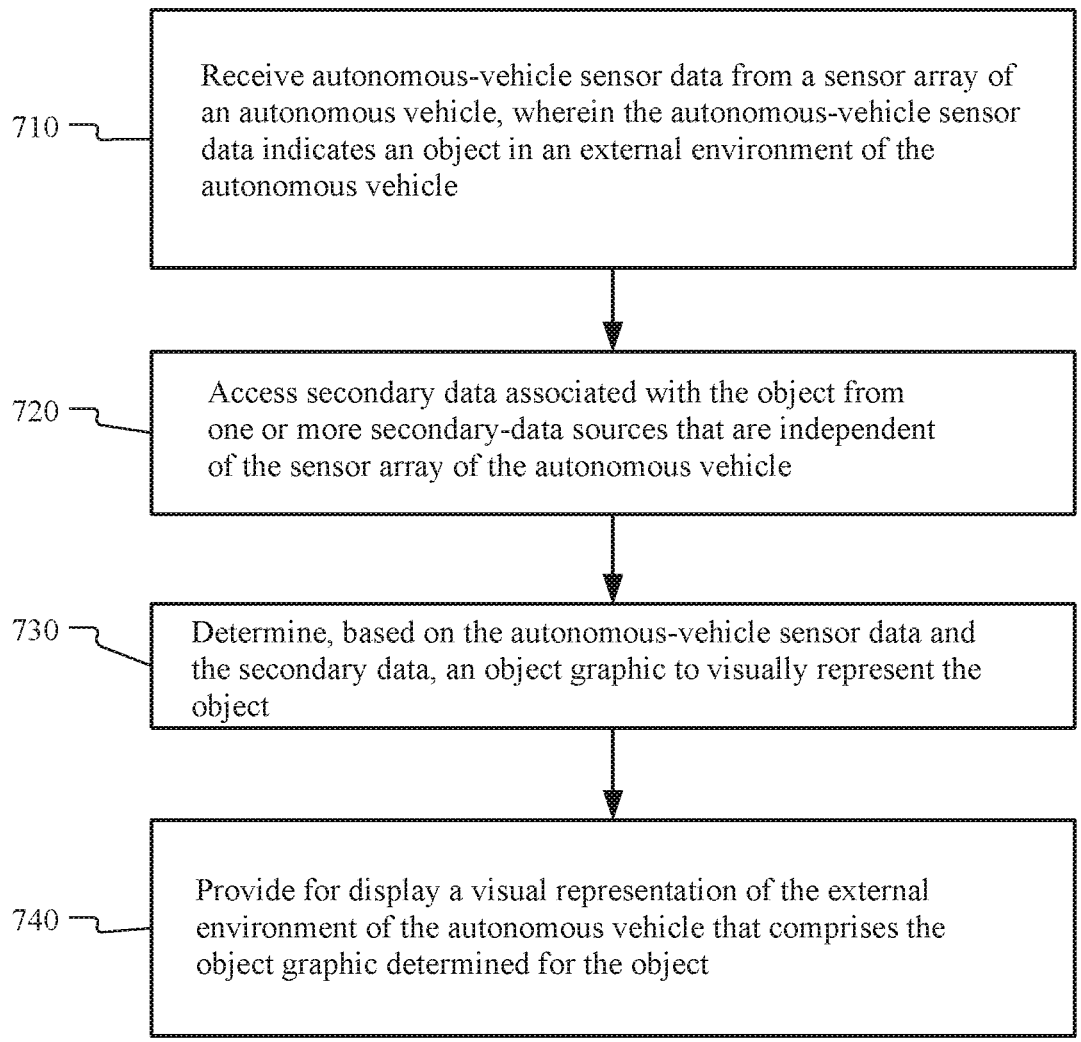
FIG. 7 illustrates an example method for using secondary data to classify an object.

FIG. 7 illustrates an example method for using secondary data to classify an object. At step 710, one or more computing devices (e.g., the autonomous-vehicle UI device, or other suitable computing device or combination thereof) may receive autonomous-vehicle sensor data from a sensor array of an autonomous vehicle, wherein the autonomous-vehicle sensor data indicates an object in an external environment of the autonomous vehicle. At step 720, the computing devices may access secondary data associated with the object from one or more secondary-data sources that are independent of the sensor array of the autonomous vehicle. At step 730, the computing devices may determine, based on the autonomous-vehicle sensor data and the secondary data, an object graphic to visually represent the object. At step 740, the computing devices may provide for display a visual representation of the external environment of the autonomous vehicle that comprises the object graphic determined for the object.

Particular embodiments may repeat one or more steps of the method of FIGS. 6 and 7, where appropriate. Although this disclosure describes and illustrates particular steps of the method of FIGS. 6 and 7 as occurring in a particular order, this disclosure contemplates any suitable steps of the method of FIGS. 6 and 7 occurring in any suitable order. Moreover, although this disclosure describes and illustrates an example method for using secondary data to make inferences about an external environment of an autonomous vehicle including the particular steps of the method of FIGS. 6 and 7, this disclosure contemplates any suitable method for using secondary data to make inferences about an external environment of an autonomous vehicle including any suitable steps, which may include all, some, or none of the steps of the method of FIGS. 6 and 7, where appropriate. Furthermore, although this disclosure describes and illustrates particular components, devices, or systems carrying out particular steps of the method of FIGS. 6 and 7, this disclosure contemplates any suitable combination of any suitable components, devices, or systems carrying out any suitable steps of the method of FIGS. 6 and 7.

Figure 8:
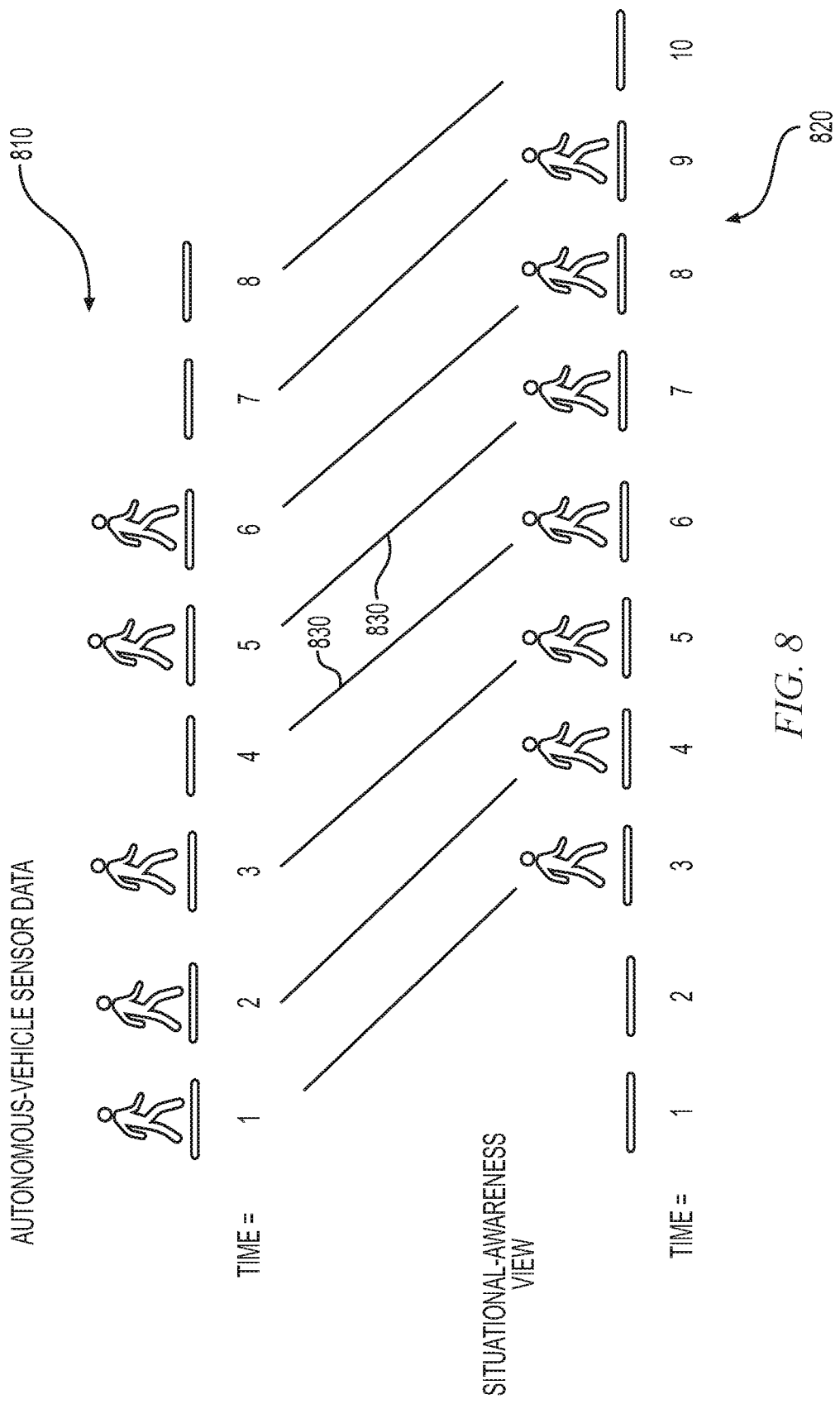
FIG. 8 illustrates an example visualization for time frame interpolation to reduce display jitter.

FIG. 8 illustrates an example visualization for time frame interpolation to reduce display jitter. As mentioned previously, one problem that may arise from receiving data that is only a partial representation of the external environment may be a jittery or choppy situational-awareness view. Jitter may be irregular movement, variation, unsteadiness, or jerkiness in the display of the situational-awareness view. This may result from receiving autonomous-vehicle sensor data that cuts out periodically. In particular embodiments, the autonomous-vehicle sensor data may be sent by the sensor array 144 in packets at regular time frames. A time frame may be a fraction of a second. Each time frame may contain a packet of data. Occasionally, a time frame may be empty, meaning either no packet was sent during that time frame, or if a packet was sent, it was either empty or corrupt, causing the data to be unreadable. This is illustrated by example time frames 1 through 8 in the example visualization of autonomous-vehicle sensor data 810. Time frames 1, 2, and 3 may contain a data packet that that contains visual and location data about an identified object classified as a pedestrian. Time frame 4 may not contain any data about the pedestrian. This may occur for a legitimate purpose: perhaps the pedestrian walked into a building between time frames 3 and 4, and so frame 4 correctly contains no information about the pedestrian. However, time frames 5 and 6 contain data packets with information about the pedestrian. Because of this blip, in the data, the autonomous-vehicle UI device may infer that the pedestrian was there the entire time, but that the autonomous-vehicle sensor data missed the pedestrian during time frame 4. If left untreated, the situational-awareness view may include an object graphic corresponding to the pedestrian that briefly disappears and then reappears. This may be disconcerting to a passenger who is viewing the situational-awareness view because it makes the passenger believe that the autonomous vehicle is not correctly interpreting and understanding the environment. To remedy this problem, the autonomous-vehicle UI device may use frame interpolation. Frame interpolation may involve analyzing the data in each time frame to determine if there are missing or corrupt data packets, and then inserting the appropriate object graphic during the time frame that is missing the data packet.

In particular embodiments, the situational-awareness view may need to display the graphical representation at least two time frames behind the received autonomous-vehicle sensor data in order to accurately fill in gaps in the sensor data. The sampling rate is so high that the data may still be shown in near real-time such that the user does not recognize the delay. As an example and not by way of limitation, consider the example illustrated in FIG. 8. Autonomous-vehicle sensor data 810 may contain information of a pedestrian during time frames 1, 2, 3, 5, and 6. At time frame 4, the pedestrian may still be walking in roughly the same location, but the sensor data simply missed it due to processing error or a disruption in the sensor data (e.g., due to the sensor being off kilter in response to the vehicle moving over a pothole). At time frame 5, the pedestrian may leave the sensing area by entering a building. The corresponding situational-awareness view may be represented by element 820. At time frames 1 and 2, no pedestrian may be displayed in the situational-awareness view. This may be because the situational awareness view lags behind the sensor data by two time frames, as illustrated by lines 730. At time frame 3, the situational-awareness view may include the pedestrian as it was received in the data packet during time frame 1. At time frame 4, the autonomous-vehicle UI device may determine that there is no pedestrian in the sensor data. Before removing the pedestrian from the situational-awareness view, the autonomous-vehicle UI device may wait to see if the pedestrian reappears in the data for time frame 5. In this example the pedestrian does reappear, so the autonomous-vehicle UI device may infer that the pedestrian was there the whole time and render the pedestrian in time frames 5, 6, and 7. However, at time frame 7, the pedestrian may disappear again. The autonomous-vehicle UI device may again wait to see if the pedestrian reappears in time frame 8. Because the pedestrian does not reappear in time frame 8, the autonomous-vehicle UI device may infer that the pedestrian has physically left the sensing range of sensor array 144 (e.g., by entering a building). But because the situational-awareness view lags behind the sensor data by two time frames, the pedestrian may be shown in the situational-awareness view for a brief period of time when the pedestrian is not in the external environment. It may be preferable to have a slight delay and render objects for one frame too long than to render a flickering object graphic.

Figure 9:
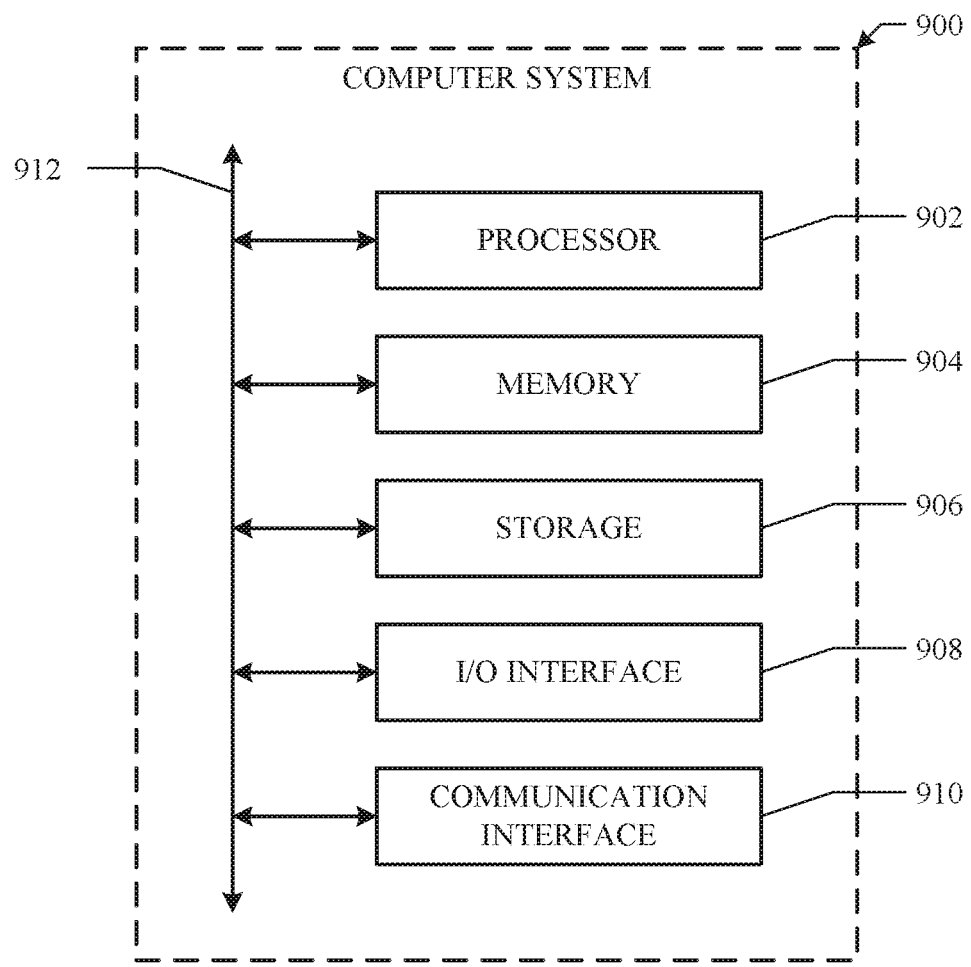
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described in further detail below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising, by one or more computing devices:
    receiving sensor data captured by a sensor array of an autonomous vehicle, wherein the sensor data indicates an object in an external environment of the autonomous vehicle;
    accessing secondary data associated with the object from one or more secondary-data sources that are independent of the sensor array of the autonomous vehicle;
    determining, based on at least the sensor data and the secondary data, a classification of the object and an associated confidence score for the classification;
    determining, based on at least the classification of the object and the associated confidence score, an object graphic to visually represent the object; and
    causing a visual representation of the external environment of the autonomous vehicle including the determined object graphic to be presented at a display associated with the autonomous vehicle.

2. The method of claim 1, wherein determining the object graphic comprises:
    identifying, from the sensor data, one or more data points that correspond to the object;
    determining, from the secondary data, one or more features of the object; and
    determining, by applying a machine-learning model to the one or more data points and the one or more features, a confidence score that indicates a probability that the one or more data points correspond to a particular object type, wherein
    the object graphic determined to visually represent the object is further based on at least the confidence score that indicates the probability that the one or more data points correspond to the particular object type.

3. The method of claim 1, further comprising, before accessing the secondary data associated with the object, determining that the sensor data only partially describes the object.

4. The method of claim 3, wherein determining that the sensor data only partially describes the object comprises determining that a similarity score between one or more data points corresponding to the object and a pre-determined pattern corresponding to a pre-classified object is below a pre-determined threshold.

5. The method of claim 1, wherein determining the object graphic to visually represent the object further comprises:
    determining, based on at least the sensor data, one or more features of the object, the one or more features comprising a color, a shape, a size, or a gait associated with the object; and
    causing the object graphic to be presented with one or more of the one or more features.

6. The method of claim 1, wherein the secondary data is user-generated data submitted by one or more users of a dynamic transportation matching system.

7. The method of claim 1, further comprising:
    determining a confidence score for the classification of the object that represents a probability that the classification is correct;
    determining that the confidence score for the classification of the object is below a predetermined threshold level; and
    causing a request for a passenger of the autonomous vehicle to input a user-provided classification for the object to be presented at the display associated with the autonomous vehicle.

8. The method of claim 1, further comprising:
determining that a confidence score associated with a classification of the object based on the sensor data captured by the sensor array of the autonomous vehicle alone is below a threshold score; and
accessing the secondary data to a update the classification of the object.

9. The method of claim 1, wherein the secondary data is map data stored by the one or more computing devices, and wherein the map data comprises a street name, a latitude and longitude coordinate, a region, or an intersection associated with the object.

10. The method of claim 9, further comprising inputting the map data into a machine-learning model that uses the map data to determine a probability that the object has a particular classification.

11. The method of claim 1, wherein the visual representation is presented on a computing device of the autonomous vehicle.

12. The method of claim 1, wherein the visual representation is presented on a client device of a current passenger of the autonomous vehicle.

13. The method of claim 1, wherein the secondary data is historical data comprising a plurality of past classifications made by the one or more computing devices during one or more previous trips of the autonomous vehicle, wherein the plurality of past classifications is used by a machine-learning model to determine a probability that the object has a particular classification.

14. The method of claim 1, wherein the display associated with the autonomous vehicle provides a situational-awareness view for a passenger of the autonomous vehicle.

15. A system comprising: one or more processors and one or more computer-readable non-transitory storage media in communication with the one or more processors, the one or more computer-readable non-transitory storage media comprising instructions that, when executed by the one or more processors, are configured to cause the system to perform operations comprising:
receiving sensor data captured by a sensor array of an autonomous vehicle, wherein the sensor data indicates an object in an external environment of the autonomous vehicle;
accessing secondary data associated with the object from one or more secondary-data sources that are independent of the sensor array of the autonomous vehicle;
determining, based on at least the sensor data and the secondary data, a classification of the object and an associated confidence score for the classification;
determining, based on at least the classification of the object and the associated confidence score, an object graphic to visually represent the object; and
causing a visual representation of the external environment of the autonomous vehicle including the determined object graphic to be presented at a display associated with the autonomous vehicle.

16. The system of claim 15, wherein determining the object graphic comprises:
identifying, from the sensor data, one or more data points that correspond to the object;
determining, from the secondary data, one or more features of the object; and
determining, by applying a machine-learning model to the one or more data points and the one or more features, a confidence score that indicates a probability that the one or more data points correspond to a particular object type, wherein
the object graphic determined to visually represent the object is further based on at least the confidence score that indicates the probability that the one or more data points correspond to the particular object type.

17. The system of claim 15, wherein the instructions are further configured to cause the system to perform further operations comprising, before accessing the secondary data associated with the object, determining that the sensor data only partially describes the object.

18. One or more computer-readable non-transitory storage media including instructions that, when executed by one or more processor of a computing system, are configured to cause the one or more processors to perform operations comprising:
receiving sensor data captured by a sensor array of an autonomous vehicle, wherein the sensor data indicates an object in an external environment of the autonomous vehicle;
accessing secondary data associated with the object from one or more secondary-data sources that are independent of the sensor array of the autonomous vehicle;
determining, based on at least the sensor data and the secondary data, a classification of the object and an associated confidence score for the classification;
determining, based on at least the classification of the object and the associated confidence score, an object graphic to visually represent the object; and
causing a visual representation of the external environment of the autonomous vehicle including the determined object graphic to be presented at a display associated with the autonomous vehicle.

19. The one or more computer-readable non-transitory storage claim 18, wherein determining the object graphic comprises:
identifying, from the sensor data, one or more data points that correspond to the object;
determining, from the secondary data, one or more features of the object; and
determining, by applying a machine-learning model to the one or more data points and the one or more features, a confidence score that indicates a probability that the one or more data points correspond to a particular object type, wherein
the object graphic determined to visually represent the object is further based on at least the confidence score that indicates the probability that the one or more data points correspond to the particular object type.

20. The one or more computer-readable non-transitory storage claim 18, wherein the instructions are further configured when executed to cause the one or more processors to perform further operations comprising, before accessing the secondary data associated with the object, determining that the sensor data only partially describes the object.

* * * * *